United States Patent
Kitajima et al.

(10) Patent No.: US 10,690,974 B2
(45) Date of Patent: Jun. 23, 2020

(54) LIQUID CRYSTAL DISPLAY DEVICE

(71) Applicant: Japan Display Inc., Tokyo (JP)

(72) Inventors: Kenji Kitajima, Oamishirasato (JP); Ryouhei Suzuki, Mobara (JP)

(73) Assignee: Japan Display Inc., Tokyo (JP)

( * ) Notice: Subject to any disclaimer, the term of this patent is extended or adjusted under 35 U.S.C. 154(b) by 0 days.

(21) Appl. No.: 16/580,572

(22) Filed: Sep. 24, 2019

(65) Prior Publication Data

US 2020/0019007 A1    Jan. 16, 2020

Related U.S. Application Data

(63) Continuation of application No. 16/058,606, filed on Aug. 8, 2018, now Pat. No. 10,466,550, which is a continuation of application No. 15/670,253, filed on Aug. 7, 2017, now Pat. No. 10,108,060, which is a continuation of application No. 15/204,597, filed on Jul. 7, 2016, now Pat. No. 9,759,967, which is a continuation of application No. 14/823,396, filed on Aug. 11, 2015, now Pat. No. 9,411,205, which is a
(Continued)

(30) Foreign Application Priority Data

Apr. 11, 2011    (JP) .................. 2011-087713

(51) Int. Cl.
| | | |
|---|---|---|
| *G02F 1/1345* | (2006.01) | |
| *G02F 1/1335* | (2006.01) | |
| *G02F 1/1362* | (2006.01) | |
| *G02F 1/1339* | (2006.01) | |

(52) U.S. Cl.
CPC ........ *G02F 1/13458* (2013.01); *G02F 1/1339* (2013.01); *G02F 1/1345* (2013.01); *G02F 1/133512* (2013.01); *G02F 1/136286* (2013.01)

(58) Field of Classification Search
CPC ............. G02F 1/133528; G02F 1/1339; G02F 1/13458; G02F 1/133512; G02F 1/13452; G02F 1/136286; G02G 2001/136263; G02G 2001/136272
See application file for complete search history.

(56) References Cited

U.S. PATENT DOCUMENTS

| | | |
|---|---|---|
| 6,750,937 B2 | 6/2004 | Karasawa et al. |
| 7,561,239 B2 | 7/2009 | Fujita |
| (Continued) | | |

FOREIGN PATENT DOCUMENTS

| | | |
|---|---|---|
| JP | H07-43706 A | 2/1995 |
| JP | H09-113886 A | 5/1997 |
| | (Continued) | |

OTHER PUBLICATIONS

Partial translation of Japanese Office Action dated May 13, 2014 for corresponding Japanese Patent Application No. 2011-087713.

*Primary Examiner* — Thanh Nhan P Nguyen (74) *Attorney, Agent, or Firm* — Michael Best & Friedrich LLP (57) ABSTRACT

A liquid crystal display device includes a thin film transistor substrate having a pixel region and a frame region, and a color filter substrate. The frame region includes a first metal wire that surrounds the outside of the pixel region, and a second metal wire that is formed so as to surround the outside of the first metal wire. The first metal wire has at least one slit at an area overlapping with a seal material.

9 Claims, 7 Drawing Sheets

Related U.S. Application Data continuation of application No. 14/453,010, filed on Aug. 6, 2014, now Pat. No. 9,140,945, which is a continuation of application No. 13/437,037, filed on Apr. 2, 2012, now Pat. No. 8,810,746.

(56) References Cited

U.S. PATENT DOCUMENTS

| | | |
|---|---|---|
| 7,595,854 B2 | 9/2009 | Sung et al. |
| 2004/0135941 A1 | 7/2004 | Nam et al. |
| 2005/0151920 A1 | 7/2005 | Watanabe et al. |
| 2008/0225221 A1 | 9/2008 | Abe |
| 2009/0268145 A1* | 10/2009 | Anjo ............... G02F 1/134363 349/141 |
| 2010/0066967 A1* | 3/2010 | Takahashi ............. G02F 1/1345 349/143 |
| 2010/0157190 A1 | 6/2010 | Lee et al. |
| 2011/0273091 A1 | 11/2011 | Fujikawa |
| 2012/0099061 A1 | 4/2012 | Lee |

FOREIGN PATENT DOCUMENTS

| | | |
|---|---|---|
| JP | 2006-171386 A | 6/2006 |
| JP | 2010-020209 A | 1/2010 |

\* cited by examiner

| L(μm) | S(μm) | APERTURE RATIO (%) |
|---|---|---|
| 7 | 5 | 41.7 |
| 8 | 5 | 38.5 |
| 9 | 5 | 35.7 |
| 10 | 5 | 33.3 |
| 11 | 5 | 31.3 |
| 12 | 5 | 29.4 |
| 13 | 5 | 27.8 |
| 14 | 5 | 26.3 |
| 15 | 5 | 25.0 |
| 16 | 5 | 23.8 |

LIQUID CRYSTAL DISPLAY DEVICE

CROSS-REFERENCE TO RELATED APPLICATIONS

This application is a continuation of U.S. application Ser. No. 16/058,606, filed on Aug. 8, 2018, which, in turn, is a continuation of U.S. application Ser. No. 15/670,253 (now U.S. Pat. No. 10,108,060), filed on Aug. 7, 2017, which, in turn, is a continuation of U.S. application Ser. No. 15/204,597 (now U.S. Pat. No. 9,759,967), filed on Jul. 7, 2016, which, in turn, is a continuation of U.S. application Ser. No. 14/823,396 (now U.S. Pat. No. 9,411,205), filed on Aug. 11, 2015, which, in turn, is a continuation of U.S. application Ser. No. 14/453,010 (now U.S. Pat. No. 9,140,945), filed on Aug. 6, 2014, which in turn, is a continuation of U.S. application Ser. No. 13/437,037 (now U.S. Pat. No. 8,810,746), filed Apr. 2, 2012. Further, this application claims priority from Japanese Application No. JP 2011-087713 filed on Apr. 11, 2011, the entire contents of which are hereby incorporated by reference into this application.

BACKGROUND OF THE INVENTION

1. Field of the Invention

The present invention relates to a liquid crystal display and a manufacturing method thereof.

2. Description of the Related Art

As display devices for information communication terminals such as a computer or television receivers, liquid crystal display devices have been widely used. The liquid crystal display device is a device which displays images by changing alignment of liquid crystal molecules sealed between two substrates of a liquid crystal panel and varying a transmissive extent of light applied to the liquid crystal panel from a backlight.

Figure 12:
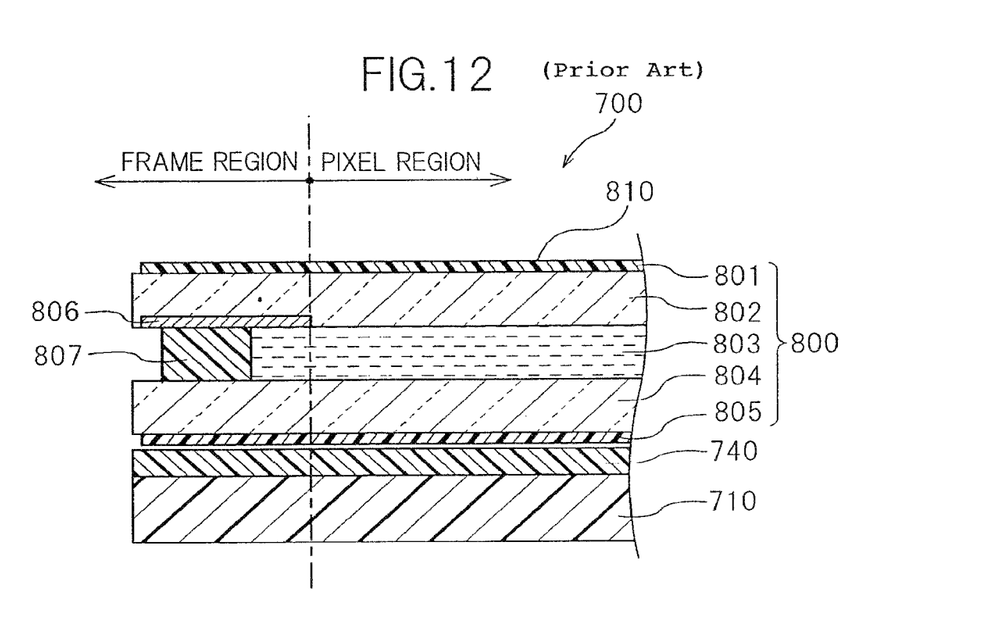
FIG. 12 is a partial cross-sectional view schematically illustrating a structure of the liquid crystal module of the liquid crystal display device in the related art.

FIG. 12 is a partial cross-sectional view schematically illustrating a structure of a liquid crystal module 700 in the related art used for the liquid crystal display device. The liquid crystal module 700 includes a liquid crystal panel 800 which has a display surface 810 and controls alignment of the liquid crystal, a light guide plate 710 to which light from a light source (not shown) is incident and allows the light to travel toward the display surface, an optical sheet 740 which applies the light emitted from the light guide plate to a display region so as to be uniform and has a plurality of sheets, and the like. In addition, the liquid crystal panel 800 includes an upper polarizer 801 which transmits only light polarized in one direction therethrough, a lower polarizer 805 which transmits only light polarized in a direction perpendicular to the one direction therethrough, a color filter substrate 802 which has color filters R (red), G (green) and B (blue) for the respective pixels, a TFT (Thin Film Transistor) substrate 804 which is provided with circuits (not shown) generating an electric field for each pixel, liquid crystal composition 803 which is sealed between the color filter substrate 802 and the TFT substrate 804, a black matrix 806 which is formed on the color filter substrate 802, and a seal 807 which is formed from a UV (ultra violet) curable material for sealing the liquid crystal composition 803 between the color filter substrate 802 and the TFT substrate 804.

In such a liquid crystal module, a black layer called the black matrix 806 is provided such that the light applied from the backlight does not leak in a frame region which is located directly outside the pixel region displaying images, and further the light is prevented from leaking by extending the polarizers 801 and 805 disposed at the upper and lower parts of the liquid crystal panel toward the frame region so as to increase a light blocking property.

SUMMARY OF THE INVENTION

However, with a demand for thinned structures at present, the polarizers are designed in a small size in order to prevent interference with the frame or the like. Thereby, the light from the backlight which can be reduced in its intensity by the polarizers in the related art reaches the black matrix without reduction in the intensity, and thus the frame region blazes with blue or is brighter than the display region during the entire black display, whereby there is a concern that performance of the display device is influenced.

The present invention has been made in consideration of these circumstances, and an object thereof is to provide a liquid crystal display device and a manufacturing method capable of increasing a light blocking property in a frame portion.

According to an aspect of the present invention, there is provided a liquid crystal display device including liquid crystal composition that varies transmittance of light by changing in alignment; and a thin film transistor substrate that is provided with a circuit formed for each of pixels and generating an electric field for controlling alignment of the liquid crystal composition, wherein the thin film transistor substrate includes a pixel region that is a rectangular region in which the pixels are formed plurally; and a frame region that is a region located outside the edge of the pixel region, and wherein the frame region includes a light blocking metal wire that surrounds the outside of at least three sides of the rectangular pixel region and has slits formed so as to partially transmit light therethrough.

In the liquid crystal display device according to the aspect of the present invention, the light blocking metal wire may be connected to a terminal of the circuit having a fixed potential.

In the liquid crystal display device according to the aspect of the present invention, the frame region may further include a disconnection detection metal wire that is formed so as to surround the outside of the three sides and is used to detect disconnection, at the outside of the light blocking metal wire.

In the liquid crystal display device according to the aspect of the present invention, the disconnection detection metal wire may be connected to a terminal for connection to an external circuit.

In the liquid crystal display device according to the aspect of the present invention, the slits may be linearly formed in a wire direction inside the light blocking metal wire or may be formed in a checkered pattern.

The liquid crystal display device according to the aspect of the present invention may further include a polarizer that transmits only light polarized in a specific direction therethrough, and the polarizer may have the same size as that of the pixel region.

In the liquid crystal display device according to the aspect of the present invention, the light blocking metal wire may be formed in the same layer as a gate wire of the circuit.

According to another aspect of the present invention, there is provided a liquid crystal display device manufacturing method including a metal wire forming process of forming a light blocking metal wire which surrounds the outside of at least three sides of a rectangular pixel region where a plurality of pixels are formed, and has slits for partially transmitting light therethrough, on a thin film transistor substrate; an ultraviolet-ray irradiating process of curing a seal material by irradiating the seal material for bonding the thin film transistor substrate and a color filter substrate to each other and sealing liquid crystal composition with ultraviolet rays via the slits of the light blocking metal wire; and a disconnection inspecting process of inspecting whether or not a disconnection detection metal wire conducts, and if not conducting, the liquid crystal display device is treated as an inspection-rejected article.

In the liquid crystal display device manufacturing method according to another aspect of the present invention, the metal wire forming process further includes forming the disconnection detection metal wire which is formed so as to surround the outside of the three sides at the outside of the light blocking metal wire and is used to detect disconnection, and a gate wire of a circuit of the pixel region may be formed at the same time.

DETAILED DESCRIPTION OF THE INVENTION

Hereinafter, embodiments of the present invention will be described with reference to the drawings. In addition, in the drawings, the same or equivalent constituent elements are given the same reference numerals, and repeated description will be omitted.

Figure 1:
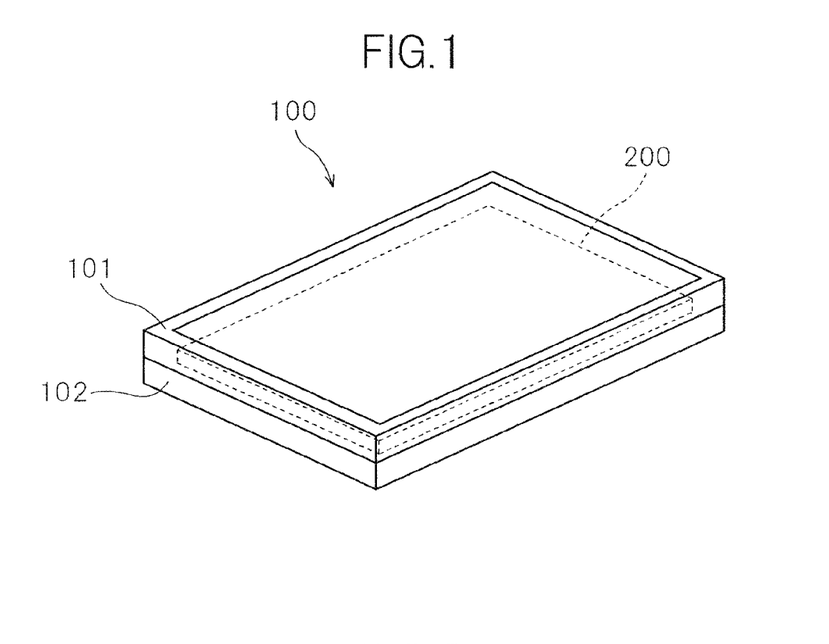
FIG. 1 is a diagram illustrating a liquid crystal display device according to an embodiment of the present invention.

FIG. 1 is a diagram illustrating a liquid crystal display device 100 according to an embodiment of the present invention. As shown in FIG. 1, the liquid crystal display device 100 includes a liquid crystal module 200, an upper frame 101 and a lower frame 102 which fix the liquid crystal module 200 so as to be interposed therebetween, a circuit substrate (not shown) provided with circuit elements generating display information, and the like.

Figure 2:
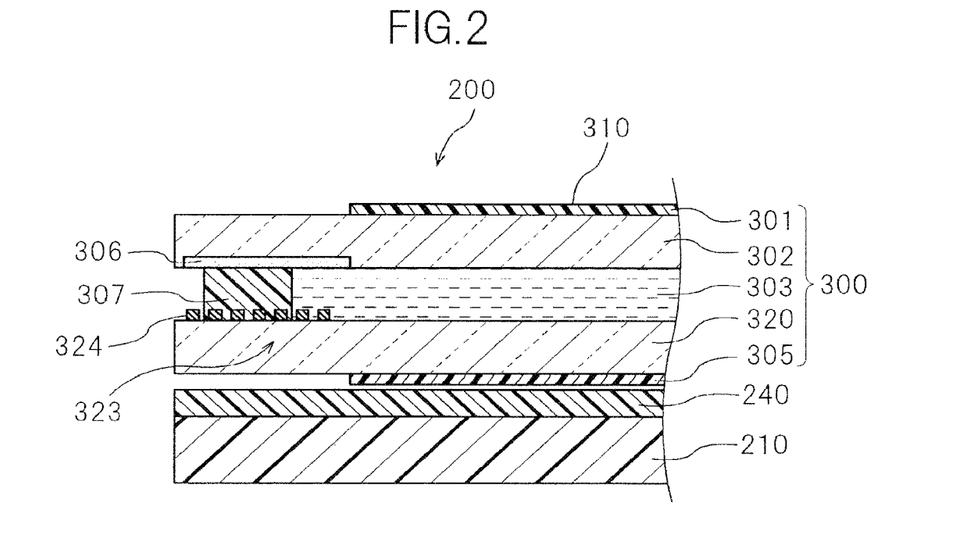
FIG. 2 is a partial cross-sectional view schematically illustrating a structure of the liquid crystal module shown in FIG. 1.

FIG. 2 is a partial cross-sectional view schematically illustrating a structure of the liquid crystal panel 200. As shown in FIG. 2, the liquid crystal panel 200 includes a liquid crystal panel 300 which has a display surface 310 and controls alignment of the liquid crystal, a light guide plate 210 to which light from a light source (not shown) is incident and allows the light to travel toward the display surface 310, an optical sheet 240 which applies the light emitted from the light guide plate 210 to a display region so as to be uniform and has a plurality of sheets, and the like.

In addition, the liquid crystal panel 300 includes an upper polarizer 301 which transmits only light polarized in one direction therethrough, a lower polarizer 305 which transmits only light polarized in a direction perpendicular to the one direction therethrough, a color filter substrate 302 which has color filters R (red), G (green) and B (blue) for the respective pixels, a TFT (Thin Film Transistor) substrate 320 which is provided with circuits (not shown) generating an electric field for each pixel, liquid crystal composition 303 which is sealed between the color filter substrate 302 and the TFT substrate 320, a black matrix 306 which is formed on the color filter substrate 302, and a seal 307 which is formed from a UV (ultra violet) curable material for sealing the liquid crystal composition 303 between the color filter substrate 302 and the TFT substrate 320. In addition, in FIG. 2, a light blocking metal wire 323 and a disconnection detection metal wire 324 described later are also shown as a part of the TFT substrate 320.

Figure 3:
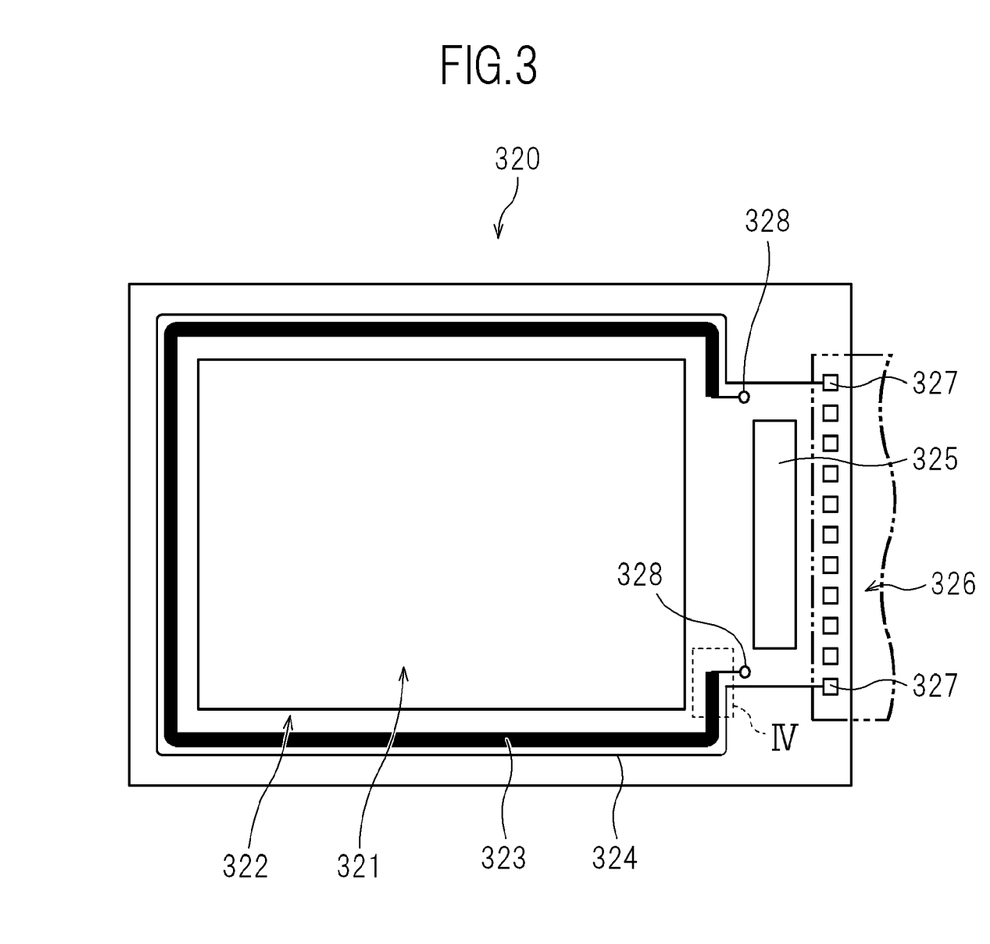
FIG. 3 is a diagram schematically illustrating the TFT substrate shown in FIG. 2 in a field of view in the perpendicular direction to the display surface.

FIG. 3 is a diagram schematically illustrating the TFT substrate 320 shown in FIG. 2 in a field of view in the perpendicular direction to the display surface 310. As shown in FIG. 3, the TFT substrate 320 includes a pixel region 321 which is a rectangular region provided with pixels formed in a matrix, a frame region 322 which is outside the pixel region 321 and frames the pixel region 321, the light blocking metal wire 323 which is formed so as to surround the outside of at least three sides of the rectangular pixel region 321, the disconnection detection metal wire 324 for detecting disconnection thereof outside the light blocking metal wire 323, a driver circuit section 325 which is provided with driver circuits for driving pixel circuits of the pixel region 321, a terminal section 326 which mainly sends and receives information such as image information to and from the driver circuit section 325 and an external substrate, two terminals 327 which are included in the terminal section 326 and are connected to the disconnection detection metal wire 324, and common electrodes 328 which are connected to the light blocking metal wire 323 and are maintained at the same potential as a common potential.

The disconnection detection metal wire 324 is connected to the terminals 327 and is thus used to detect disconnection by checking conduction using the terminals 327, for example, in a manufacturing process after the liquid crystal panel 300 is assembled. In a case where disconnection is detected, cracks in the TFT substrate 320 are also regarded as having influence on the pixel region, and the liquid crystal panel is treated as an inspection-rejected article. In addition, the light blocking metal wire 323 is connected to the common electrodes 328 such that an unnecessary electric field is not generated.

Figure 4:
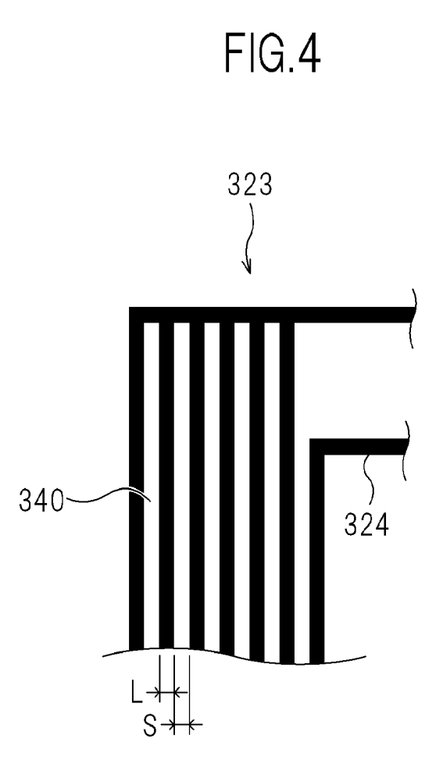
FIG. 4 is a enlarged view schematically illustrating a portion shown in IV of FIG. 3 in relation to the wiring shapes of the light blocking metal wire and the disconnection detection metal wire.

FIG. 4 is a enlarged view schematically illustrating a portion shown in IV of FIG. 3 in relation to the wiring shapes of the light blocking metal wire 323 and the disconnection detection metal wire 324. As shown in FIG. 4, the light blocking metal wire 323 has slits 340 which are linearly formed in the wire direction such that UV rays which are applied to cure the seal 307 shown in FIG. 2 are effectively applied, and a metal portion for blocking light in order to weaken intensity of light from the backlight. In addition, the disconnection detection metal wire 324 is formed along the light blocking metal wire 323 outside of the light blocking metal wire 323. Further, in FIG. 4, the number of the slits 340 of the light blocking metal wire 323 is five, but may be larger than or smaller than that.

Figure 5:
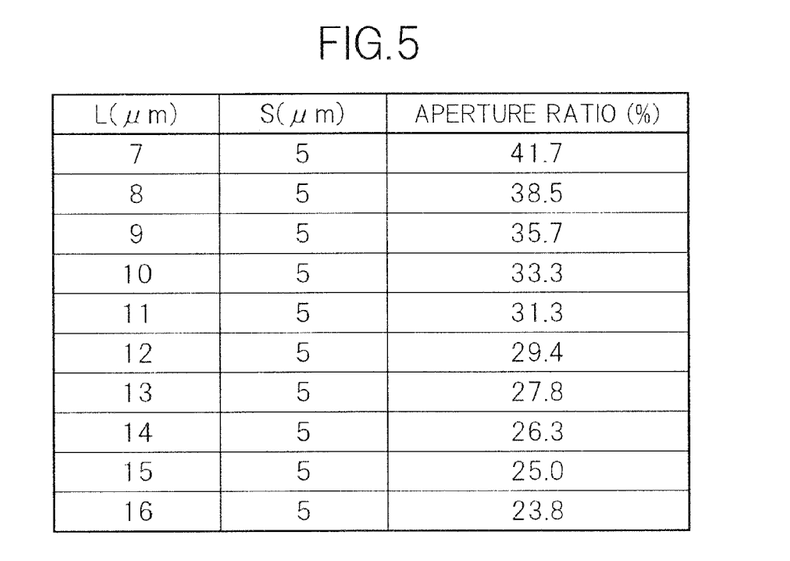
FIG. 5 is a table illustrating an aperture ratio in a case where the slit width S of the light blocking metal wire shown in FIG. 4 and the line width L of the metal line formed between the adjacent slits are defined.

FIG. 5 is a table illustrating an aperture ratio in a case where the slit width S of the light blocking metal wire 323 shown in FIG. 4 and the line width L of the metal line formed between the adjacent slits 340 are defined. In addition, here, a case where the slit width S is fixed to 5 µm is shown. In addition, in the table, the aperture ratio 41.7% when the line width L is 7 µm and the slit width S is 5 µm is the same aperture ratio as in the lower polarizer 305. In addition, the disconnection detection metal wire 324 is fixed to 10 µm. In any case of employing the aperture ratios shown in the table, the seal 307 can be cured by the UV rays in a state of blocking light from the backlight.

Figure 6:
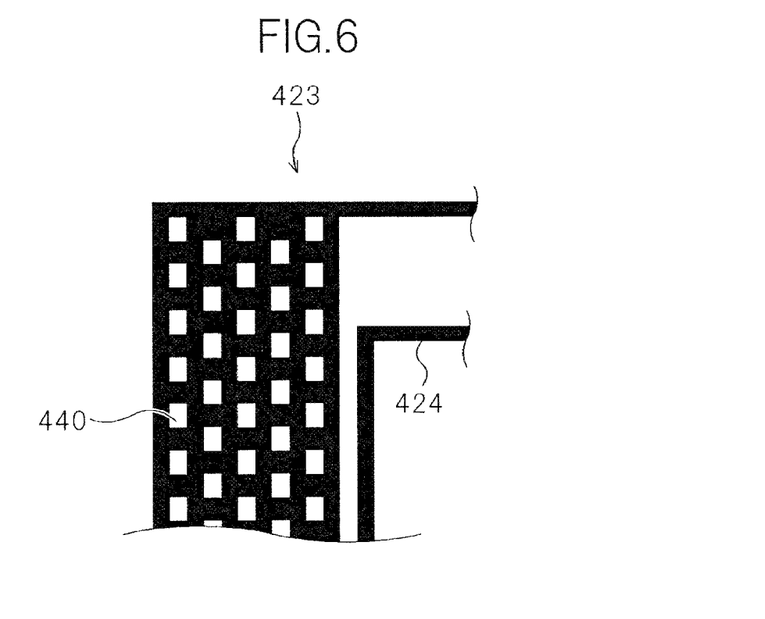
FIG. 6 is a diagram schematically illustrating a modified example of the shapes of the light blocking metal wire and the disconnection detection metal wire in the same field of view as in FIG. 4.

FIG. 6 is a diagram schematically illustrating a light blocking metal wire 423 and a disconnection detection metal wire 424 according to a modified example of the wiring shapes of the light blocking metal wire 323 and the disconnection detection metal wire 324 in the same field of view as in FIG. 4. As shown in FIG. 6, in the modified example, slits 440 formed in the light blocking metal wire 423 are formed so as to be dispersed in a checkered pattern. In this case as well, the seal 307 can be cured by the UV rays in a state of blocking light from the backlight.

Figure 7:
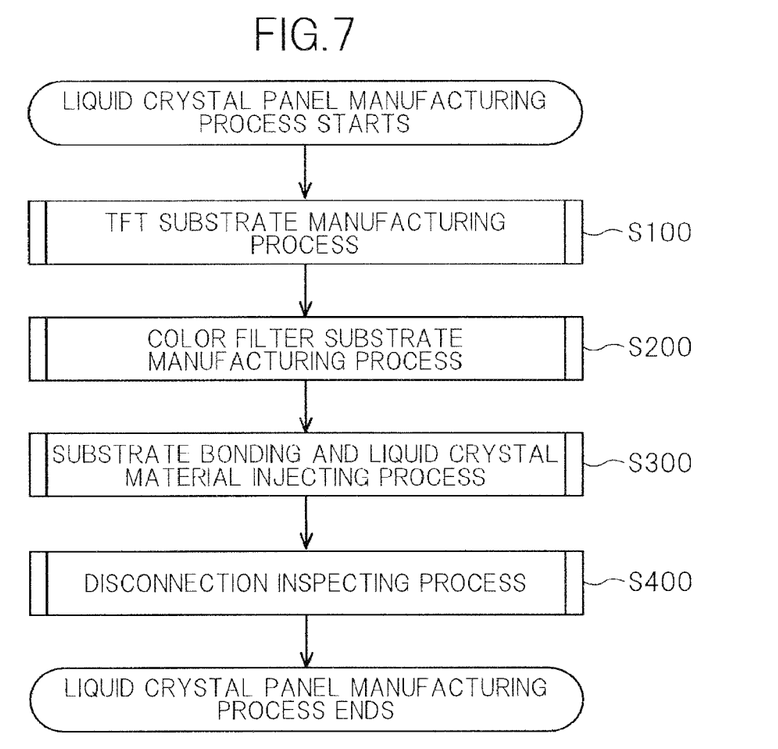
FIG. 7 is a flowchart illustrating a liquid crystal panel manufacturing process which is a process in the manufacturing method of the liquid crystal display device.

FIG. 7 is a flowchart illustrating a liquid crystal panel manufacturing process which is a process in the manufacturing method of the liquid crystal display device 100. As shown in this flowchart, the liquid crystal panel manufacturing processes sequentially include a TFT substrate manufacturing process S100 for manufacturing the TFT substrate 320, a color filter substrate manufacturing process S200 for manufacturing the color filter substrate 302, substrates bonding and liquid crystal material injecting process S300 for bonding the TFT substrate 320 and the color filter substrate 302 together and injecting a liquid crystal material therebetween, and a disconnection inspecting process S400 for detecting disconnection of circuits of the TFT substrate 320.

Figure 8:
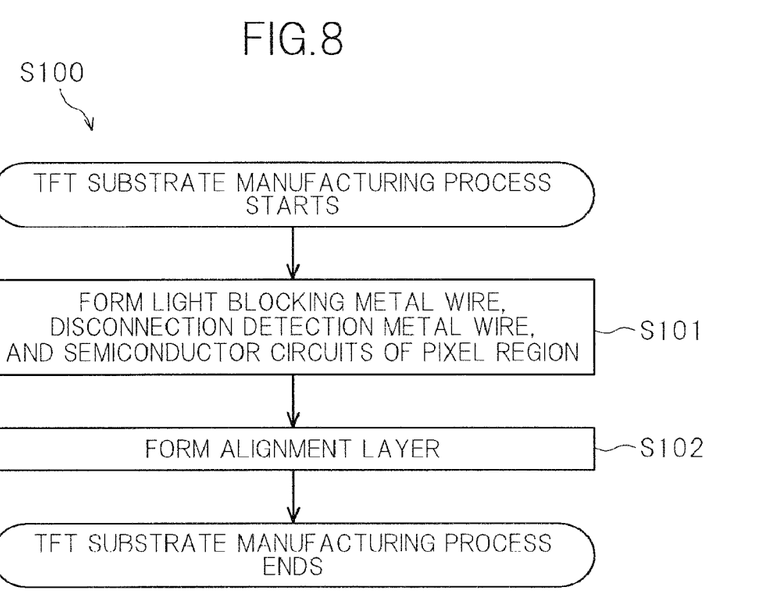
FIG. 8 is a flowchart illustrating details of the TFT substrate manufacturing process shown in FIG. 7.

FIG. 8 is a flowchart illustrating details of the TFT substrate manufacturing process S100 shown in FIG. 7. As shown in this flowchart, in the TFT substrate manufacturing process S100, first, in step S101, semiconductor circuits in the pixel region 321 are formed along with the light blocking metal wire 323 and the disconnection detection metal wire 324 through a photolithography process. Next, in step S102, an alignment layer for aligning liquid crystal in one direction on the liquid crystal surface side is formed. Here, although, in the present embodiment, the light blocking metal wire 323 and the disconnection detection metal wire 324 are formed along with the gate wires of the circuits in the pixel region 321, they may be formed along with other metal wires of the circuits in the pixel region 321. With such simultaneous formation, the light blocking metal wire 323 and the disconnection detection metal wire 324 can be formed without increasing the number of processes.

Figure 9:
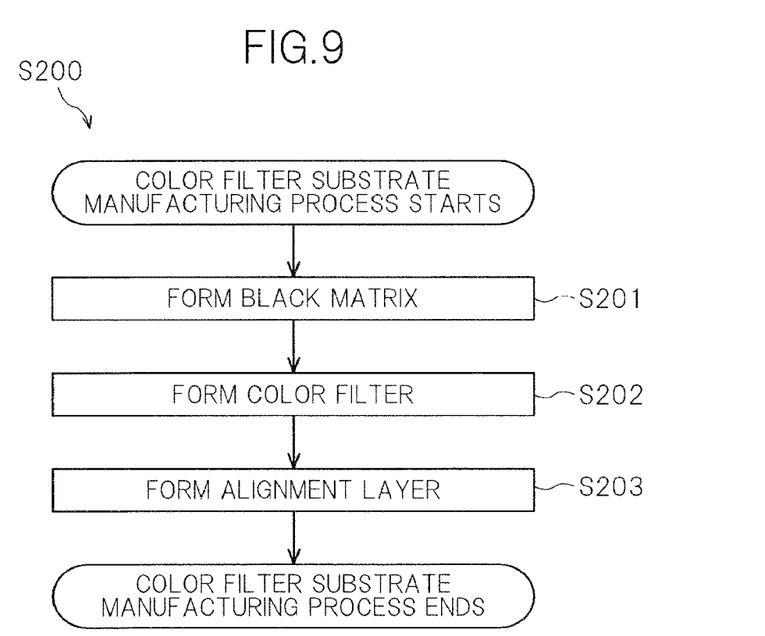
FIG. 9 is a flowchart illustrating details of the color filter substrate manufacturing process shown in FIG. 7.

FIG. 9 is a flowchart illustrating details of the color filter substrate manufacturing process S200 shown in FIG. 7. As shown in this flowchart, in the color filter substrate manufacturing process S200, first, in step S201, the black matrices 306 are formed on the periphery of the pixel region 321 and the periphery of each pixel so as to prevent light from leaking. Next, in step S202, color filters of R (red), G (green), and B (blue) are formed in the ranges of the pixels formed by the black matrices 306. Finally, in step S203, an alignment layer for aligning the liquid crystal in one direction on the liquid crystal surface side is formed.

Figure 10:
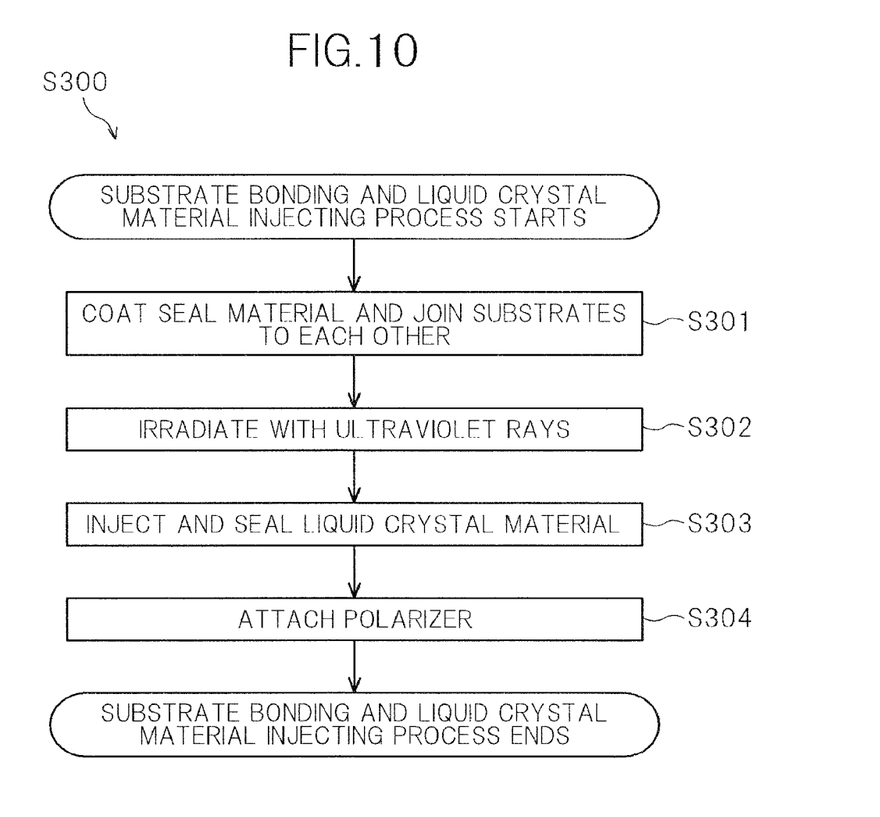
FIG. 10 is a flowchart illustrating details of the substrate bonding and liquid crystal material injecting process shown in FIG. 7.

FIG. 10 is a flowchart illustrating details of the substrate bonding and liquid crystal material injection process S300 shown in FIG. 7. As shown in this flowchart, in the substrate bonding and liquid crystal material injecting process S300, first, in step S301, a seal material is coated on the periphery of the pixel region 321 then the TFT substrate 320 and the color filter substrate 302 are bonded each other. Next, in step S302, the coated seal material is irradiated with the UV rays via the light blocking metal wire 323 to be cured. Next, in step S303, a liquid crystal material is injected into the substrates bonded to each other and is sealed. Finally, in step S304, the upper polarizer 301 is attached to the color filter substrate 302 and the lower polarizer 305 is attached to the TFT substrate 320.

Figure 11:
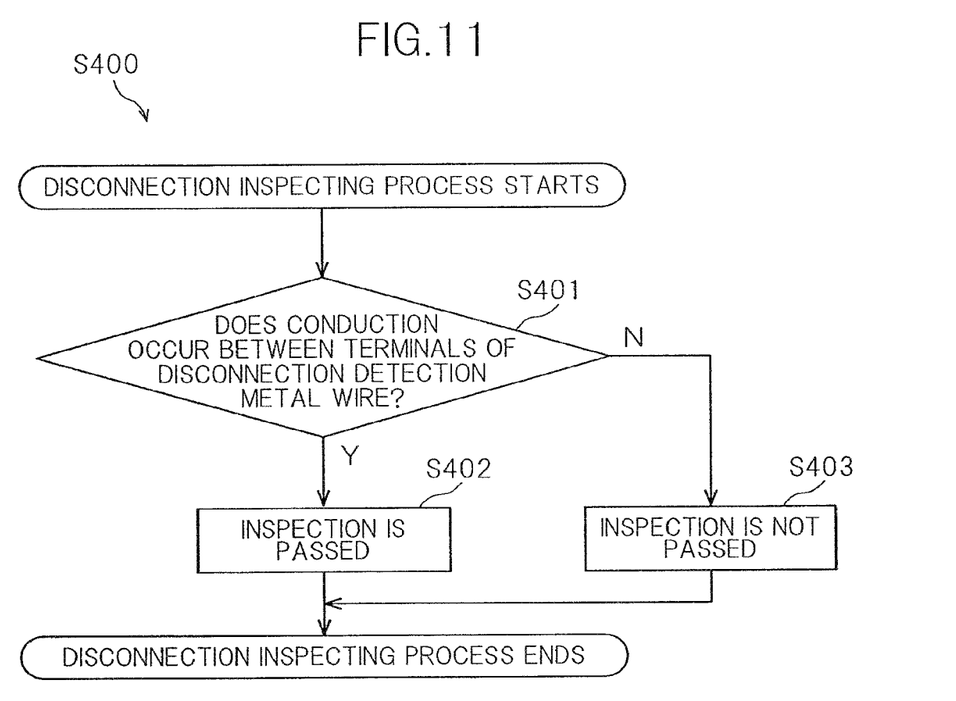
FIG. 11 is a flowchart illustrating details of the disconnection inspecting process shown in FIG. 7.

FIG. 11 is a flowchart illustrating details of the disconnection inspecting process S400 shown in FIG. 7. As shown in this flowchart, in the disconnection inspecting process S400, first, in step S401, it is checked whether the two terminals 327, which are connected to the disconnection detection metal wire 324, electrically conducts or not. Here, if they electrically conducts, inspection is passed (step S402), and if they do not electrically conduct, inspection is not passed (step S403). With respect to the light blocking metal wire 323 formed in the frame region, the disconnection detection metal wire 324 is formed at the outermost part. In other words, the disconnection detection metal wire 324 is formed at the outermost circumference among wires formed on the TFT substrate 320. Through the detection of conduction in the disconnection detection metal wire 324, it is possible to detect presence or absence of defects of the TFT substrate 320. If there are cracks on the TFT substrate, the disconnection detection metal wire 324 is disconnected and thus the two terminals 327 cannot electrically conduct. If the disconnection detection metal wire 324 is disposed at the outermost circumference, early detection of small cracks extending from the glass substrate edge to the inside is possible.

As described above, according to the liquid crystal display device 100 according to the present embodiment, even if the polarizers are small, the frame region 322 having the slits 340 has a sufficient light blocking property via the light blocking metal wire 323, and, in the manufacturing process, the seal 307 sealing a liquid crystal material can be cured by transmitting the UV rays therethrough. In addition, it is possible to detect cracks of the TFT substrate 320, for example, in a process after the liquid crystal panel 300 is manufactured, using the disconnection detection metal wire 324 which is formed along the light blocking metal wire 323 and is located in the same layer as the light blocking metal wire 323.

Although the light blocking metal wire has slits having the shapes as shown in FIGS. 4 and 6, a shape thereof is not limited to these shapes.

While there have been described what are at present considered to be certain embodiments of the invention, it will be understood that various modifications may be made thereto, and it is intended that the appended claim cover all such modifications as fall within the true spirit and scope of the invention.

What is claimed is:

1. A liquid crystal display device comprising:
a lower polarizer;
an upper polarizer;
a TFT substrate including a plurality of terminals arranged in a first direction, a plurality of pixels in a pixel region, first metal wiring outside of the pixel region, and second metal wiring outside of the first metal wiring;
a color filter substrate having a first surface and a second surface opposed to the first surface;
a liquid crystal between the TFT substrate and the color filter substrate;
a seal sealing the liquid crystal; and
an external circuit connected to the plurality of terminals, wherein
the TFT substrate is between the lower polarizer and the liquid crystal,
the color filter substrate is between the upper polarizer and the liquid crystal,
the upper polarizer is on the first surface of the color filter substrate,
the first metal wiring has a first part and a second part,
the first part and the second part extend in a second direction intersecting with the first direction,
the pixel region is between the first part and the second part in the first direction,
the second metal wiring has a third part and a fourth part,
the third part and the fourth part extend in the second direction,
the first part is between the third part and the pixel region in the first direction,
the second part is between the pixel region and the fourth part in the first direction,
the first part has a plurality of openings,
the seal overlaps the plurality of openings of the first part,
the upper polarizer does not overlap the seal and the plurality of openings of the first part,
the upper polarizer does not overlap the third part and the fourth part,
one of the plurality of openings of the first part is defined by at least two branch lines of the first part,
the two branch lines extend in the second direction, and
a first width of the one of the plurality of openings in the first direction is smaller than a second width of the one of the two branch lines in the first direction.

2. The liquid crystal display device of claim 1, wherein the lower polarizer does not overlap the seal and the plurality of openings of the first part.

3. The liquid crystal display device of claim 1, wherein a third width of the third part in the first direction is larger than the second width.

4. The liquid crystal display device of claim 1, wherein a third width of the third part in the first direction is smaller than the second width.

5. The liquid crystal display device of claim 1, wherein
the third part is connected to a first terminal of the plurality of terminals,
the fourth part is connected to a second terminal of the plurality of terminals,
the first part is connected to a first common electrode, and
the second part is connected to a second common electrode.

6. The liquid crystal display device of claim 1, wherein
an outer edge of the upper polarizer overlaps the liquid crystal, and
an outer edge of the lower polarizer overlaps the liquid crystal.

7. The liquid crystal display device of claim 6, wherein
the color filter substrate has a periphery light shielding layer, and
the periphery light shielding layer overlaps the seal, the third part, the first part, and the plurality of openings of the first part.

8. The liquid crystal display device of claim 7, wherein an inner edge of the periphery light shielding layer overlaps the outer edge of the upper polarizer.

9. A liquid crystal display device comprising:
a lower polarizer;
an upper polarizer;
a TFT substrate including a plurality of terminals arranged in a first direction, a plurality of pixels in a pixel region, first metal wiring outside of the pixel region, and second metal wiring outside of the first metal wiring;
a color filter substrate having a first surface and a second surface opposed to the first surface;
a liquid crystal between the TFT substrate and the color filter substrate;
a seal sealing the liquid crystal; and
an external circuit connected to the plurality of terminals, wherein
the TFT substrate is between the lower polarizer and the liquid crystal,
the color filter substrate is between the upper polarizer and the liquid crystal,
the upper polarizer is on the first surface of the color filter substrate,
the first metal wiring has a first part and a second part,
the first part and the second part extend in a second direction intersecting with the first direction,
the pixel region is between the first part and the second part in the first direction,
the second metal wiring has a third part and a fourth part,
the third part and the fourth part extend in the second direction,
the first part is between the third part and the pixel region in the first direction,
the second part is between the pixel region and the fourth part in the first direction,
the first part has a plurality of openings,
the seal overlaps the plurality of openings of the first part,
the upper polarizer does not overlap the seal and the plurality of openings of the first part,
the upper polarizer does not overlap the third part and the fourth part,
the third part is connected to a first terminal of the plurality of terminals,
the fourth part is connected to a second terminal of the plurality of terminals,
the first part is connected to a first common electrode, and
the second part is connected to a second common electrode.

* * * * *